United States Patent
Kappeler

(10) Patent No.: US 10,435,589 B2
(45) Date of Patent: Oct. 8, 2019

(54) DEVICE AND METHOD FOR APPLYING ADHESIVE TO A SUBSTRATE

(71) Applicant: Robatech AG, Muri (CH)

(72) Inventor: Roman Kappeler, Muri (CH)

(73) Assignee: ROBATECH AG, Muri (CH)

( * ) Notice: Subject to any disclaimer, the term of this patent is extended or adjusted under 35 U.S.C. 154(b) by 0 days.

(21) Appl. No.: 15/458,205

(22) Filed: Mar. 14, 2017

(65) Prior Publication Data
US 2017/0253768 A1 Sep. 7, 2017

(30) Foreign Application Priority Data

Mar. 3, 2016 (EP) ..................................... 16158476

(51) Int. Cl.
*C09J 5/00* (2006.01)
*B05D 1/28* (2006.01)
(Continued)

(52) U.S. Cl.
CPC ................ *C09J 5/00* (2013.01); *B05C 1/006* (2013.01); *B05C 1/0813* (2013.01); *B05C 1/0817* (2013.01); *B05C 11/1039* (2013.01); *B05D 1/28* (2013.01); *B27D 5/003* (2013.01); *B27G 11/02* (2013.01); *B05C 1/0804* (2013.01);
(Continued)

(58) Field of Classification Search
CPC ............................ B05C 1/0817; B05C 1/0813
See application file for complete search history.

(56) References Cited

U.S. PATENT DOCUMENTS

| 4,441,831 A * | 4/1984 | Tipple ........................ B41J 3/38 400/134.2 |
| 2008/0040908 A1* | 2/2008 | Pekurovsky ............ B05C 5/025 29/428 |

(Continued)

FOREIGN PATENT DOCUMENTS

| DE | 2939102 A1 | 4/1981 |
| DE | 20203827 U1 | 8/2002 |

(Continued)

OTHER PUBLICATIONS

European Patent Office, European Search Report and Written Opinion, dated Sep. 1, 2016 (dated Sep. 1, 2016), 8 pages, EPO Munich, Germany.

*Primary Examiner* — Xiao S Zhao
(74) *Attorney, Agent, or Firm* — Christopher C. Dremann, P.C.; Christopher C. Dremann

(57) ABSTRACT

A device for applying adhesive to a substrate, having an application roller that is rotatable about an axis, an installation for dispensing adhesive to a circumferential area of the application roller, a dispensing region of the application roller for dispensing adhesive from the application roller, and having a doctor blade, wherein the dispensing region for adhesive in the rotation direction of the application roller is located behind the installation for dispensing the adhesive to the application roller and ahead of the doctor blade. In such a device it is provided that the application roller is rotatable about a vertical axis and the excess adhesive wiped by the doctor blade reaches a collection installation that is located below the doctor blade. In a method for applying adhesive to a substrate, excess adhesive that has not been applied to the substrate is disposed of.

16 Claims, 2 Drawing Sheets

(51) Int. Cl.
  *B05C 1/00*   (2006.01)
  *B05C 1/08*   (2006.01)
  *B05C 11/10*  (2006.01)
  *B27G 11/02*  (2006.01)
  *B27D 5/00*   (2006.01)

(52) U.S. Cl.
  CPC ......... *B05C 1/0856* (2013.01); *C09J 2201/61* (2013.01); *C09J 2475/00* (2013.01)

(56) References Cited

U.S. PATENT DOCUMENTS

2011/0052816 A1\* 3/2011 Bagung ................. B27D 5/003
                                                          427/284
2012/0240846 A1    9/2012 Lin

FOREIGN PATENT DOCUMENTS

| DE | 112008003942 T5 | 6/2011 |
| DE | 202014009945 U1 | 1/2015 |
| EP | 1243345 B1 | 5/2006 |
| EP | 1798013 A1 | 6/2007 |
| WO | 2010011200 A1 | 1/2010 |

\* cited by examiner

DEVICE AND METHOD FOR APPLYING ADHESIVE TO A SUBSTRATE

CROSS-REFERENCE TO RELATED APPLICATION

This United States nonprovisional utility patent application claims the benefit of priority to European Patent Application No. 16 158 476.8 filed on Mar. 3, 2016, the entire disclosure of which is incorporated herein by reference.

FIELD OF THE INVENTION

The invention relates to a device for applying adhesive to a substrate, having an application roller that is rotatable about an axis, an installation for dispensing adhesive to a circumferential area of the application roller, a dispensing region of the application roller for dispensing adhesive from the application roller, and having a doctor blade, wherein the dispensing region for adhesive in the rotation direction of the application roller is located behind the installation for dispensing the adhesive to the application roller and ahead of the doctor blade.

The invention furthermore relates to a method for applying adhesive to a substrate.

BACKGROUND OF THE INVENTION

Boards, in particular such from wood or a wood-containing material, are nowadays employed in the most varied of applications. In order for the boards to be visually appealing and to be adaptable to the requirements of the application, a flexible edge strip is often adhesively placed over the narrow edges of said boards, and flexible cover boards or strips are often adhesively placed over the large faces. Furniture for the kitchen or the bathroom is very often made from such boards, for example.

As used herein, substrate is understood to include in particular such planar objects as the mentioned boards from wood or a wood-containing material, furthermore hollow-core boards, sometimes also referred to as a workpiece. The adhesive treatment of exposed edges of a planar object, in particular of such a planar object from wood or a wood-containing material, using an edge strip, in order to generate a visually appealing and durable impact, is usually referred to as edge-banding. The exposed edges are typically the narrow edges of the product.

Edge-banding machines are available for the production of substrates of this type, or of boards of this type, respectively. There are machines which are capable of providing the large face of the boards with cover boards or cover tapes, and there are machines which are intended for providing the narrow edges with the edge strip. Machines which are capable of carrying out both the processes are also known.

RELATED ART

A glue tank for edge-banding machines having a gluing head is known from DE 202 03 827 U1. The gluing head has an interior space that on the upper side of the gluing head terminates in an inlet opening through which liquid adhesive can be inwardly conveyed. The interior space is connected to an exit slot which is adjoined by a rotatable metering rod, the rotation axis of the latter running vertically. The metering rod is externally adjoined by an application roller, the rotation axis thereof likewise running vertically. The application roller is rotatably mounted on a bearing block that is fastened above the gluing head, and is connected to a rotation motor. By way of the rotation motor, the application roller can be rotated in a manner synchronous with the direction of movement of a workpiece, or so as to run counter to the latter. A gap through which adhesive from the interior space of the gluing head can make its way to the rotating application roller and thereby be transferred to the roller can be generated by rotating the metering rod. The application of adhesive on the application roller herein has a constant length in the axial direction of the roller, said length corresponding to a clearance on the metering rod. The adhesive-layer thickness on the application roller can be adjusted by rotating the metering rod. The workpieces to be processed by way of the edge are now transported past the rotating application roller that is provided with adhesive, said workpieces herein accepting the adhesive. The workpieces are guided past the application roller always in the same transportation direction.

By way of the gluing head described and of the associated storage container, the system is suitable for processing various adhesives (PUR, EVA, PA, PO, etc.). A changeover from one adhesive to another herein can be performed with relatively little effort. However, adhesives such as polyurethane which engage in a cross-linking process with the water from the ambient air are operable in the described system only at increased complexity. A large proportion of the adhesive layer on the application roller is permanently exposed to the ambient air. Only adhesive having the thickness of the workpiece is removed from the application roller by the workpiece. Furthermore, the workpieces are transported past the application roller, with intermediate gaps existing between the former. The adhesive on the roller that is not stripped makes its way back into the exit slot and is again transferred by the metering rod to the roller. Little adhesive is consumed when workpieces having a minor thickness are being processed, and the recirculating adhesive starts to cross-link. This leads to a deterioration in the quality of the adhesive and thus to diminished adhesion of the adhesive. There is also the risk of the metering rod no longer being able to transfer the adhesive cleanly to the application roller and thus to the workpiece, because parts of the adhesive that are partially cross-linked can no longer be uniformly metered.

A further disadvantage of the gluing head described lies in that the adhesive that is outwardly conveyed by way of the application roller and the metering rod comes into contact with the dust in the environment. Despite vacuum systems, woodworking machines are always exposed to dust in the environment. The adhesive that is returned to the exit slot mixes with the new adhesive. On account thereof the quality of the adhesive and thus the adhesion of the adhesive are diminished. This disadvantage exists in the case of all adhesives processed.

Apart from the systems described, systems in which the adhesive is infed directly from a preliminary melting apparatus by way of a tube from below or from above into an interior space are also known. In most instances, the interior space is embodied so as to be comparatively large in order for the former to be employed as an adhesive reservoir.

All systems presently known for edge-banding of a substrate have the disadvantage that the application of adhesive to the leading edge and to the trailing edge is applied such that said adhesive projects slightly beyond the edges. Since the adhesive film is applied to the application roller on the entire roller circumference, an excessive accumulation of adhesive is created at the inlet of the substrate into the application roller. Adhesive is trailed behind at the outlet.

This disadvantage is significant, for example, when, in the case of a rectangular product, the two edges of the substrate are orthogonal to that edge that is provided with adhesive and have already been provided with the edge strip. The excessively applied adhesive herein becomes visible on these edge strips and has to be stripped by way of an additional operative step.

A device of the type mentioned at the outset is known from DE 29 39 102 A1. By means of this device and of the method that is described in this context, adhesive may be infed by an adhesive-conveying pump to a switchable valve that is located downstream, and from there through a line to a slot die. The adhesive is transferred from the slot die to an application roller, and transferred from the rotating application roller to a moved substrate. A doctor blade and a collection tank for receiving the excess adhesive are furthermore part of this device. The collection tank may be supplied continuously with fresh adhesive by means of a connection. The adhesive is suctioned from the collection tank by the adhesive-conveying pump. The doctor blade wipes the excess adhesive from the application roller prior to the latter being supplied with new adhesive by the slot die which lies parallel with the application-roller axis. When viewed in the rotation direction of the application roller, the doctor blade is located downstream of that point at which the application roller transfers adhesive to the substrate.

A leveling doctor blade which is provided for homogenizing and periodically cycling the adhesive film on the application roller can optionally be located between the slot die and the point of adhesive-dispensing to the substrate.

The switchable valve in the line is switched by a controller. Alternatively or additionally to the leveling doctor blade, periodical cycling of the adhesive film may be performed by switching the valve. The adhesive quantity that is transferred from the die to the application roller can be adapted by modifying the rotation speed of the adhesive-conveying pump. A different conveyed quantity of adhesive is required depending on the speed of the substrate, the desired layer thickness of the adhesive on the substrate, or the application width of the adhesive on the application roller.

The device is suitable for substrates in which that side that is coated with adhesive is horizontally aligned. Only approximately half of the adhesive film can be transferred from the application roller to the substrate due to the synchronous running of the roller circumference of the application roller and the substrate. This means that a not insignificant part of the adhesive has to be returned to the collection tank. The rotation axis of the roller herein is horizontally aligned.

On account of the excess adhesive having to be returned to the circuit again, the same disadvantages pertaining to PUR and to dust in the environment that have already been described above in reference to DE 202 03 827 U1 arise.

A further disadvantage of the glue applicators that are employed nowadays lies in that the adhesive is run in a so-called open system. The adhesive dwells in an adhesive reservoir, a trough, or an interior space of the gluing head that is open to the environment. On account thereof, vapors which spread unpleasant odors and, in particular in the case of PUR, may even have health-threatening effects are released.

OBJECTS AND SUMMARY OF THE INVENTION

It is an object of the invention to achieve a device and a method for applying adhesive to a substrate, wherein it is to be possible to process various types of adhesive without having to accept the known disadvantages of the prior art. In particular, it is to be possible to apply an adhesive film to the edges, in particular the narrow edges, of a substrate.

In particular, an application in the case of edge-banding machines which are suitable for infeeding an edge strip is to be possible.

The object is achieved by a device which is configured according to the present invention as shown and described herein with reference to exemplary embodiments thereof.

In the case of this device according to the invention the application roller is rotatable about a vertical axis and the excess adhesive wiped by the doctor blade reaches a collection installation that is located below the doctor blade. This wiped adhesive is thus no longer returned to the adhesive applicator and thus to the installation for dispensing adhesive to the circumferential area of the application roller.

A particular advantage of the device according to the invention is to be seen in that the adhesive comes into contact with the ambient air only briefly. This reduces the contamination of the adhesive by dust from the environment, and fewer vapors which are released to the ambient air are created. The installation for discharging adhesive to the circumferential area of the application roller under this aspect is preferably positioned such that the application roller has to transport the adhesive only across a short part of the circumference. This herein is preferably approximately a quarter of the circumference of the application roller.

An application of adhesive to the substrate that is not continuous on the latter may also be implemented by means of the type of application of the adhesive from the installation for dispensing the adhesive to the circumferential area of the application roller, and from the application roller to the substrate. In the case of a respective design of the installation for dispensing the adhesive, arbitrary application patterns may be implemented by way of interruptions in the adhesive.

In the case of the device according to the invention it is furthermore advantageous for the adhesive that is wiped by the doctor blade to be collected by the collection device once sufficient adhesive has built up on the doctor blade. This wiped adhesive reaches the collection installation that is located below the doctor blade. This collection installation may be of arbitrary design; the former serves for collecting the adhesive so as to accumulate the latter, for example in a trough, or else so as to be able to discharge the latter, for example by means of a conveying pump.

The application roller is configured in particular as a cylinder. This cylinder may readily be a hollow cylinder. Heating of the application roller is preferably provided.

According to one exemplary embodiment of the invention it is furthermore provided that the application roller is drivable. In particular, the application roller may be driven at various angular speeds.

According to another exemplary embodiment it is provided that the installation for dispensing adhesive is configured as a nozzle. This nozzle is a slot die, in particular. This slot die is preferably modifiable both in terms of the slot extent as well as in terms of the location of the slot in relation to the application roller. In particular, the spacing of the slot in relation to the application roller may be adjusted. In the case of a slot die being used, the extent of the slot is vertical, in particular. In the case of a vertical slot extent it is provided in particular that the lower end of the slot is non-modifiable, the upper region being modifiable for the purpose of adjusting the slot length. This refinement is to be viewed under the aspect that, independently of the thickness of the substrate, a lower side of the substrate during conveying is non-modifiable, and that only the position of the upper face of the substrate is modified in relation to the vertical as the thickness of the respective substrate varies.

It is seen as particularly advantageous for the rotation direction of the application roller to be counter to a displacement direction, in particular a rectilinear displacement direction, of the substrate. This displacement direction of the substrate is in particular horizontal. Consequently, the adhesive is transferred to the moving substrate, in particular transferred to an edge of the moving substrate, in the direction that is counter to said displacement direction. The adhesive is almost completely stripped from the application roller by the counter rotation of the application roller in relation to the transportation direction of the substrate. Accordingly, the quantity of adhesive that is still to be wiped off by the doctor blade is rather minor. Thus only a rather minor quantity of adhesive has to be disposed of.

The use of a slot die has the particular advantage that the adhesive, specifically an adhesive film, that is transferred to the application roller can be formed to be exactly so wide and so long that said adhesive film, when transferred to the substrate, covers the latter from the leading edge to the trailing edge with adhesive, and that no adhesive is applied beyond the leading edge or the trailing edge. The quantity of adhesive that is conveyed from the slot die to the application roller is capable of being exactly metered by the volumetric conveying of present-day adhesive-application apparatuses.

An application of adhesive to the substrate that does not have to be continuous on the substrate can be generated by the device. Arbitrary application patterns having interruptions in the adhesive can be implemented.

In terms of the location of the slot die and of the doctor blade it is seen as particularly advantageous for the slot die and the doctor blade to mutually enclose a circular angle of 160° to 200°, in particular 180°. Thus, the circular angle between the application of adhesive to the application roller and wiping the excess adhesive from the application roller corresponds to approximately a semicircle.

It is seen as particularly advantageous for the slot die and a vertical in relation to a surface of the substrate that is to be provided with adhesive to enclose a circular angle of 80° to 100°, in particular 90°, and/or for the doctor blade and this vertical in relation to the surface of the substrate that is to be provided with adhesive to enclose a circular angle of 60° to 120°, in particular 90°.

In particular, the slot of the slot die is located so as to be parallel with the rotation axis of the application roller, and/or the doctor blade is located so as to be parallel with the rotation axis of the application roller.

The application roller is preferably composed of a hardenable material and is hardened at least in the region of the roller circumference. Alternatively, a surface coating may also be employed as wear protection.

The application roller, the installation for dispensing adhesive, and the doctor blade are preferably mounted in a first support, this first support being horizontally guided in a second support and being spring-mounted horizontally in the direction of contact of the application roller with the substrate. The application roller herein during the transfer of the adhesive is pressed lightly against the substrate, in particular lightly against that edge of the substrate that is to be glued, such that said application roller has positive contact with said substrate.

It is seen as particularly advantageous for the application roller, and/or the installation for applying adhesive, and/or the doctor blade, and/or the heating installation to be mounted in an overhung position. In particular, the mounting in an overhung position is in each case performed on the same side of the device.

The object is furthermore achieved by a method according to the present invention. In the case of this method for applying adhesive to a substrate it is provided that the adhesive is applied to a rotating application roller, adhesive is transferred from the application roller to the substrate that is conveyed in a rectilinear manner along the application roller, excess adhesive that has not been applied to the substrate is wiped from the application roller, and this excess adhesive is disposed of. A particularly good transfer rate of the adhesive from the application roller to the substrate is to be obtained when the adhesive is applied by means of the application roller counter to the transportation direction of the substrate. It is of particular advantage for the circumferential speed of the application roller to be one to two times the substrate speed.

In the case of the method it is particularly advantageous when the exit of adhesive from the installation for dispensing adhesive is cycled in such a manner that the width of the adhesive application to the application roller corresponds to the thickness of the substrate, and/or the adhesive application to the substrate commences with a leading edge of the substrate and ends with a trailing edge of the substrate.

Further features of the invention are disclosed by the detailed description of exemplary embodiments, the description of the figures, and in the figures per se, wherein it is to be noted that all individual features and all combinations of individual features are relevant to the invention.

BRIEF DESCRIPTION OF THE FIGURES

The invention is visualized in the figures by means of an exemplary embodiment of the invention in a schematic illustration, without being limited to this exemplary embodiment.

DETAILED DESCRIPTION OF EXEMPLARY EMBODIMENTS

Figure 1:
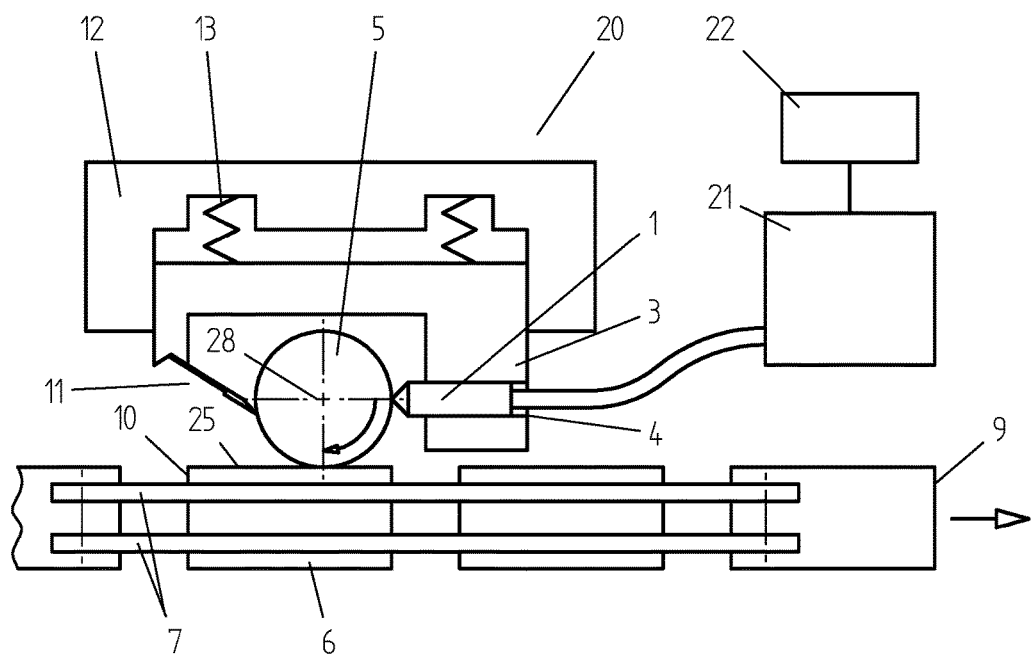
FIG. 1 shows a plan view of a device according to the invention, having a transportation system and substrates that are conveyed by means of the transportation system.

By means of the device 20, which is also referred to as the adhesive applicator, adhesive 8 is applied by means of a slot die 1 to a rotating heatable application roller 5 that is configured as a hollow cylinder and by counter rotation transfers the adhesive 8 to a face 25 of a moving cuboid substrate 6, and wherein adhesive which after the transfer of adhesive to the substrate 6 still adheres to the application roller 5 is wiped off by means of a doctor blade 11, this wiped adhesive 15 no longer being returned to the device.

The device 20 and a transportation system 7 for conveying the substrate 6 are illustrated in FIG. 1. The slot die 1 is supplied with adhesive from an adhesive-application apparatus 21 by way of a tube 2. The slot die 1 by way of a longitudinal guide 4 is held in a first support 3. By way of the longitudinal guide 4 the potential for displacing the slot die 1 in the longitudinal direction, transversely to the axial direction of the heatable application roller 5, is achieved. On account thereof, the spacing of the nozzle slot from the application roller 5 can be modified. Furthermore, in the case of a large spacing it is possible for a cover to be attached over the nozzle slot, by way of which cover blocking of the nozzle slot by cross-linked PUR adhesive can be prevented in particular with PUR adhesive. This is required when an edge-banding machine, in the context of which the device 20 is being used, is not operated for a prolonged period and no adhesive is being processed. The longitudinal guide 4 for mounting the slot die 1 is designed such that the slot die 1 can be readily dismantled for cleaning and maintenance purposes. The application roller 5 is located so as to be approximately parallel, in particular parallel with the nozzle slot of the slot die 1. Said application roller 5 is drivable by a regulated motor, and transports the adhesive 8, specifically an adhesive film 8, which is applied by the slot die 1, toward a substrate 6.

Heating of the application roller 5 is performed by a fixedly installed stationary heating element which is to be found inside the interior of the application roller 5. The heating element is heated by way of heating cartridges. A liquid heat transfer medium is employed for transferring the heat from the heating element to the rotating application roller 5. The application roller 5 is mounted in an overhung position, and the heating element is likewise mounted in an overhung position and is supported on the mounting side.

The motor for driving the application roller 5, and the heating cartridges of the application roller 5, are connected to a controller 22 of the adhesive-application apparatus 21.

The transportation system 7 is driven by an edge-banding machine. This transportation system 7 has, for example, upper and lower belt tapes and rollers, the substrate being held and transported therebetween. The substrate 6 herein is transported by the transportation system 7 past the application roller 5. The substrate is clamped between the belt tapes and the rollers in such a manner that the substrate is not laterally displaced even if and when slight transverse forces act on the substrate. The application roller 5 contacts the substrate 6 when the substrate 6 is being transported past the application roller. As is visualized by the arrow 23, the application roller 5 rotates counter to the running direction of the substrate 6, the latter being visualized by the arrow 24, such that the adhesive film 8 is wiped from the application roller 5 and is transferred to that narrow edge, thus that narrow lateral face 25 of the substrate 6 that faces the circumferential face 26 of the application roller 5 and is located parallel with the rotation axis of the application roller 5. The adhesive film 8 by the slot die 1 is applied to the application roller 5 at a width b (see FIG. 3) which corresponds exactly to the thickness of the substrate 6, or is slightly narrower than the latter. On account thereof, almost one hundred percent of the adhesive that is transported on the application roller 5 is stripped when the adhesive is wiped off by the substrate 6. The exit of adhesive from the slot die 1 is cycled by the controller 22 of the adhesive-application apparatus 21 in such a manner that the beginning of the adhesive film commences exactly with the leading edge 9 of the substrate 6, and the end terminates exactly with the trailing edge 10 of the substrate 6. The circumferential speed of the application roller 5 is readjustable. A circumferential speed which corresponds approximately to one to two times the substrate speed is preferred. This guarantees that adhesive is very cleanly transferred from the application roller 5 to the substrate 6. If the circumferential speed of the application roller 5 is modified, this will have an influence on the cycling of the adhesive film 8 at the slot die. The controller 22 of the adhesive-application apparatus 21 automatically adapts the cycling to the new conditions. An application of adhesive that is not continuous on the substrate 6 can also be implemented by way of this type of adhesive application from the slot die 1 by way of the application roller 5 to the substrate 6. Arbitrary application patterns with interruptions in the adhesive can be implemented.

A further advantage lies in that the adhesive comes into contact with the ambient air only briefly. This reduces the contamination of the adhesive by dust from the environment, and fewer vapors which are released to the ambient air are created. Therefore, the slot die 1 is located such that the application roller 5 has to transport the adhesive only across a short part of the circumference. In the exemplary embodiment this is approximately a quarter of the circumference of the application roller 5.

In order for the application roller 5, while transferring adhesive to the narrow edge 25 of the substrate 6, to positively contact the substrate 6, said application roller 5 is pressed against the substrate 6 by way of a sprung suspension. The application roller 5 is mounted in the first support 3. The doctor blade 11 is likewise connected to the first support 3. The first support 3 is mounted by way of a linear guide in a second support 12 which is fixedly connected to the machine frame. The first support 3, and thus the application roller 5, are displaceable by the longitudinal guide toward the narrow edge 25 of the substrate 6. A defined pressure by means of springs 13 is exerted by the application roller 5 toward the substrate 6. On account thereof, minor positional deviations of the substrate 6 in the transportation system 7 can additionally be absorbed. In place of the linear guides, the first support 3 could also be suspended in a pivotable manner.

The application roller 5 is preferably composed of a hardenable material, and is hardened at least in the region of the roller circumference. Alternatively, a surface coating can be employed. On account thereof, the wear on that external face of the application roller 5 that comes into contact with the substrate 6 can be reduced.

Figure 2:
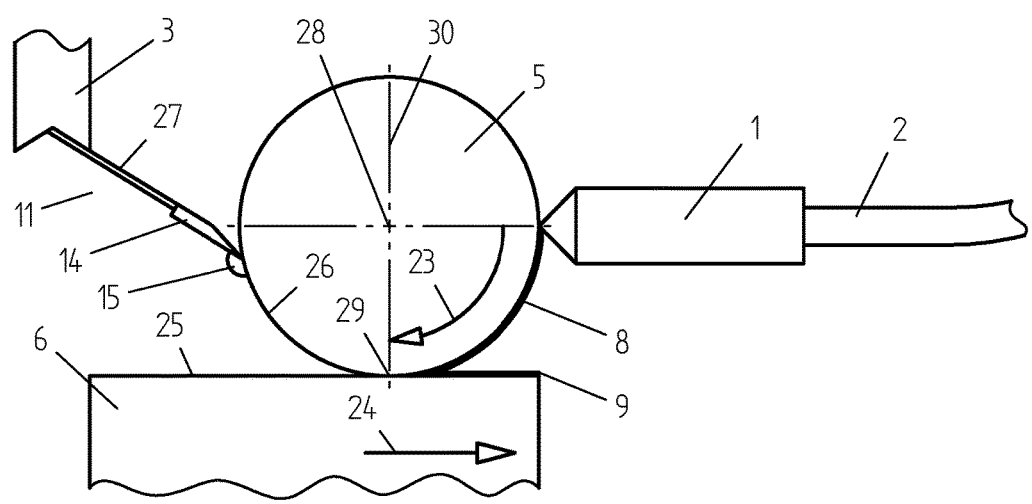
FIG. 2 shows an enlarged fragment of the region of the application roller that is illustrated in the context of the device according to FIG. 1.

The doctor blade 11 has a doctor knife 14 (FIG. 2) which is connected to the first support 3 by way of a spring steel sheet 27. The doctor knife 14 is set against the circumferential face 26 of the application roller 5 at a slight pressure. Residual adhesive which, once the application roller 5 has transferred the adhesive film to the substrate 6, still adheres to the application roller 5 is wiped off by the doctor knife 14. The wiped adhesive 15 builds up in the forward region of the doctor knife 14 and, once sufficient adhesive has built up, flows in the direction of the rotation axis 28 of the application roller 5, thus downward in the vertical direction. The first support 3 is heated in order to facilitate flowing of the adhesive. Said first support 3 conducts the heat by way of the spring steel sheet 27 to the doctor knife 14. Heat also reaches the wiped adhesive 15 from the heated application roller 5, such that said wiped adhesive 15, following gravity, begins to flow once sufficient wiped adhesive has accumulated.

The dispensing region of the slot die 1 and a vertical 30 in relation to that surface 25 of the substrate 6 that is to be provided with adhesive 8 enclose an angle of 90°, the wiping region of the doctor blade 11 with this vertical 30 likewise enclosing an angle of 90°.

Figure 3:
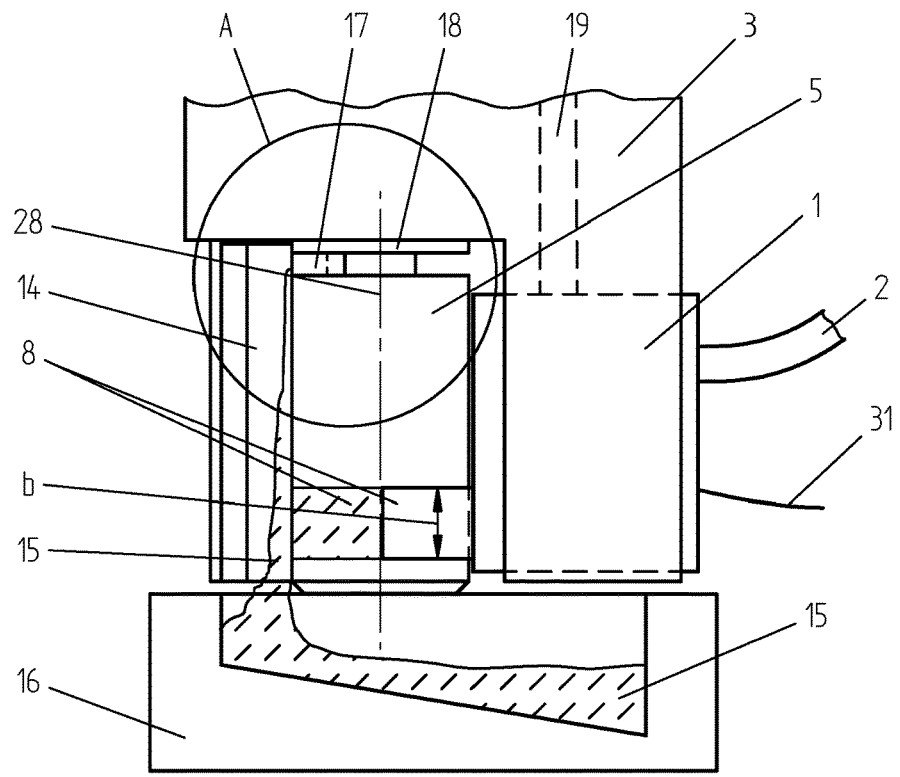
FIG. 3 shows a side view of the device according to FIG. 1, viewed from the side of the substrate.
Figure 4:
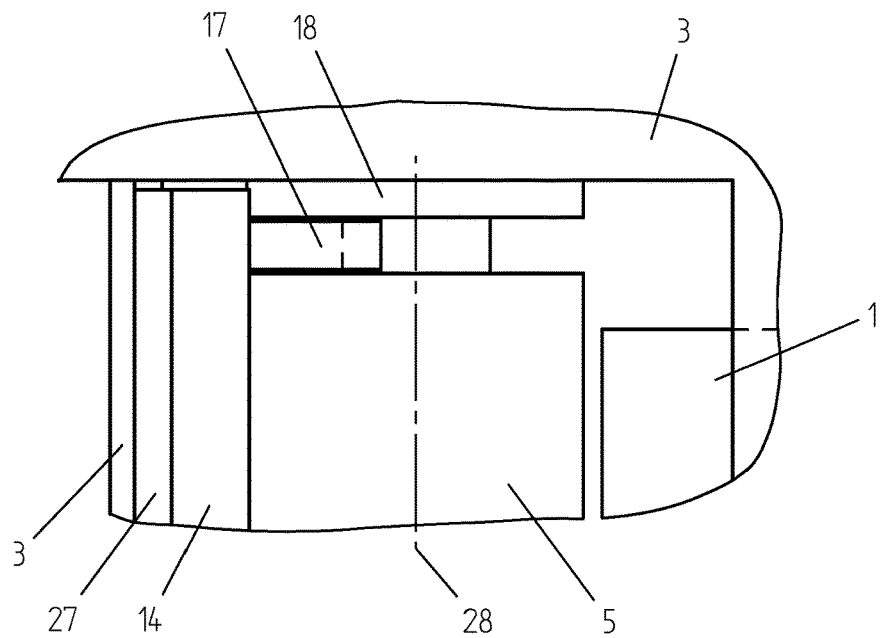
FIG. 4 shows an enlarged fragment A of FIG. 3, of a rearward peripheral region of the application roller with the doctor blade.

It is illustrated in FIG. 3 that the wiped adhesive 15 runs vertically downward, and is collected in a collection trough 16. The collection trough 16 is periodically emptied by hand, and the adhesive is disposed of in particular as residual waste/in-house waste. Almost the entire roller length of the application roller 5 is provided with adhesive if very thick substrates 6 are being processed. In this case, it may happen that the wiped adhesive 15 not only runs down on the doctor knife 14 but also diverts somewhat upward. Therefore, an adhesive deflector 17 (see FIG. 4) is attached to the upper end of the application roller 5. The adhesive deflector 17 is attached between the end of the application roller 5 and a flange 18 of the first support 3. Said adhesive deflector 17 wipes off adhesive which under certain circumstances can reach behind the periphery of the application roller 5, and returns said adhesive back to the doctor knife 14. The flange 18 has an external diameter which corresponds to the diameter of the application roller 5. The doctor knife 14 protrudes beyond the upper periphery of the application roller 5. Said doctor knife 14 herein covers the adhesive deflector 17 and the flange 18 of the first support 3. The doctor knife 14 terminates at a minimum gap on the delimitation face of the first support 3. Adhesive that is caught in this region has to occasionally be removed by hand.

The width b of the adhesive film 8 is illustrated in FIG. 3. The length of the nozzle slot can be readjusted by the bar 19. Should the substrate 6 be thicker, the length of the nozzle slot is thus enlarged in an upward manner. The lower delimitation of the substrate 6 always remains at the same position. The substrate thickness is modified only in an upward manner. This readjustment of the length of the nozzle slot can be performed by hand or by an actuator. Should the readjustment be performed by an actuator, the latter is thus connected to the controller 22 of the adhesive-application apparatus 21 and is actuated by the latter. The slot die 1 is connected to the controller 22 of the adhesive-application apparatus 21 by way of a cable harness 31. The power for heating the slot die 1, the actuation of the valves for cycling the adhesive output, and the necessary measurement signals are exchanged through the cable harness 31. All heating units of the device 20 are likewise connected to the adhesive-application apparatus 21 and are controlled by the controller of the adhesive-application apparatus 21.

That which is claimed is:

1. A device for applying adhesive to a substrate, comprising:
   an application roller that is rotatable about a vertical axis of rotation of the application roller;
   an installation for dispensing adhesive to the application roller;
   a dispensing region of the application roller for dispensing adhesive from the application roller onto the substrate; and
   a doctor blade for wiping excess adhesive from the application roller;
   wherein the dispensing region for dispensing the adhesive from the application roller onto the substrate is located behind the installation for dispensing the adhesive to the application roller and ahead of the doctor blade in a rotation direction of the application roller;
   wherein the excess adhesive wiped by the doctor blade reaches a collection installation located vertically beneath the application roller;
   wherein the installation for dispensing adhesive is configured as a nozzle comprising a slot die having a vertical slot;
   wherein a slot length of the vertical slot is adjustable in a vertical direction that is parallel to the vertical axis of rotation of the application roller;
   wherein the application roller, the installation for dispensing adhesive, and the doctor blade are mounted in a first support that is horizontally guided in a second support and spring-mounted horizontally in a direction of contact of the application roller with the substrate; and
   wherein the slot die by way of a horizontal guide is held in the first support.

2. The device according to claim 1, wherein the application roller is configured as a drivable cylinder.

3. The device according to claim 1, wherein the slot length of the vertical slot is non-modifiable at a lower end and is modifiable in an upper region.

4. The device according to claim 1, wherein the slot die is mounted such that the spacing from the application roller is modifiable.

5. The device according to claim 1, wherein a rotation direction of the application roller is counter to a displacement direction of the substrate.

6. The device according to claim 5, wherein the displacement direction of the substrate is a rectilinear and horizontal displacement direction of the substrate.

7. The device according to claim 1, wherein the slot die and the doctor blade are diametrically located.

8. The device according to claim 1, wherein the slot die and the doctor blade mutually enclose a circular angle of between about 160° and about 200°.

9. The device according to claim 8, wherein the circular angle is about 180°.

10. The device according to claim 1, wherein the slot die and a vertical in relation to a surface of the substrate that is to be provided with adhesive enclose a circular angle of between about 80° and about 100°, and wherein the doctor blade and the vertical in relation to the surface of the substrate that is to be provided with adhesive enclose a circular angle of between about 60° and about 120°.

11. The device according to claim 10, wherein the slot die and the vertical in relation to the surface of the substrate that is to be provided with adhesive enclose a circular angle of about 90°, and wherein the doctor blade and the surface of the substrate that is to be provided with adhesive enclose a circular angle of about 90°.

12. The device according to claim 1, wherein the application roller is heatable by means of a heating installation.

13. The device according to claim 12, wherein the application roller, the installation for applying adhesive, the doctor blade, and the heating installation are mounted on the same side of the device relative to the substrate.

14. A method for applying adhesive to a substrate comprising:
   applying the adhesive to a rotatable application roller as the application roller is rotating about a vertical axis of rotation of the application roller using an installation for dispensing adhesive;
   transferring the adhesive from the application roller to the substrate as the substrate is conveyed in a rectilinear and horizontal manner relative to the application roller;
   wiping an excess of the adhesive that has not been applied to the substrate from the application roller using a doctor blade; and
   disposing the excess of the adhesive in a collection installation located vertically beneath the application roller;

wherein the installation for dispensing adhesive is configured as a nozzle comprising a slot die having a vertical slot;

wherein a slot length of the vertical slot is adjustable in a vertical direction parallel to the vertical axis of rotation of the application roller;

wherein the application roller, the installation for dispensing adhesive, and the doctor blade are mounted in a first support that is horizontally guided in a second support and spring-mounted horizontally in a direction of contact of the application roller with the substrate; and wherein the slot die by way of a horizontal guide is held in the first support.

15. The method according to claim 14, wherein transferring the adhesive from the application roller to the substrate comprises applying adhesive by means of the application roller in a rotation direction that is counter to a displacement direction of the substrate with a circumferential rotation speed of the application roller being between about one and about two times a displacement speed of the substrate conveyed in the rectilinear and horizontal manner relative to the application roller.

16. The method according to claim 14, wherein the installation for dispensing adhesive is cycled such that an application of adhesive to the substrate commences with a leading edge of the substrate and ends with a trailing edge of the substrate, and wherein a width of an application of adhesive to the application roller corresponds to the thickness of the substrate.

* * * * *